United States Patent
Van Ochten et al.

Patent Number: 5,613,905
Date of Patent: Mar. 25, 1997

[54] METHOD AND DEVICE FOR OPENING A SLAUGHTERED ANIMAL

[75] Inventors: Sander A. Van Ochten, Lichtenvoorde; Leonardus J. A. Tiggeloven, Groenlo, both of Netherlands

[73] Assignee: Stork R.M.S. B.V., Netherlands

[21] Appl. No.: 577,294

[22] Filed: Dec. 22, 1995

Related U.S. Application Data

[63] Continuation of Ser. No. 185,946, filed as PCT/NL92/00129, Jul. 13, 1992, abandoned.

[30] Foreign Application Priority Data

Jul. 18, 1991 [NL] Netherlands ............... 9101262
Apr. 6, 1992 [NL] Netherlands ............... 9200649

[51] Int. Cl.⁶ .................................... A22B 5/20
[52] U.S. Cl. ................. 452/160; 452/120; 30/286
[58] Field of Search ................. 452/160, 109, 452/120, 106; 30/286

[56] References Cited

U.S. PATENT DOCUMENTS

| | | |
|---|---|---|
| 1,465,866 | 8/1923 | Rendlich . |
| 1,498,753 | 6/1924 | Rendlich . |
| 2,198,814 | 4/1940 | Hart . |
| 3,174,223 | 3/1965 | Gerson . |
| 3,241,236 | 3/1966 | Capps . |
| 3,439,420 | 4/1969 | Erickson . |
| 3,445,931 | 5/1969 | Knudson . |
| 4,653,150 | 3/1987 | Leining .................... 452/160 |
| 4,682,417 | 7/1987 | Henslin et al. . |
| 4,841,602 | 6/1989 | van der Hoorn et al. ........ 452/160 |
| 5,139,457 | 8/1992 | Rankin et al. ............... 452/160 |

FOREIGN PATENT DOCUMENTS

| | | |
|---|---|---|
| 0212579 | 3/1987 | European Pat. Off. . |
| 0258937 | 3/1988 | European Pat. Off. . |
| 237892 | 7/1910 | Germany . |
| 2626070 | 12/1976 | Germany . |
| 6508973 | 7/1966 | Netherlands . |
| 204013 | 11/1987 | New Zealand . |
| 186838 | 12/1936 | Switzerland ................ 452/160 |

Primary Examiner—Willis Little
Attorney, Agent, or Firm—Webb Ziesenheim Bruening Logsdon Orkin & Hanson, P.C.

[57] ABSTRACT

The invention provides a method for opening a slaughtered animal comprising the following steps of:
(1) providing a slaughtered animal;
(2) suspending the animal from the hind legs;
(3) arranging a cut in the belly wall close to the hind legs substantially in the plane of symmetry of the animal;
(4) continuing this cut in substantially vertical downward direction; and
(5) holding the intestines clear of the belly wall during step (4).

30 Claims, 8 Drawing Sheets

METHOD AND DEVICE FOR OPENING A SLAUGHTERED ANIMAL

This is a continuation of application Ser. No. 08/185,946 filed on Mar. 30, 1994, now abandoned.

BACKGROUND OF THE INVENTION

1. Field of the Invention

The invention relates to a method and apparatus for opening a slaughtered animal.

2. Background Information

Although many proposals have already been made for mechanically opening slaughtered animals, this work is in practice still performed manually. A problem in cutting open a slaughtered animal is that when the belly wall is cut open touching of the internal organs must be avoided in order to prevent contamination.

SUMMARY OF THE INVENTION

To obviate this problem the invention provides a method for opening a slaughtered animal comprising the following steps of:

(1) providing a slaughtered animal;

(2) suspending the animal from the hind legs;

(3) arranging a cut in the belly wall close to the hind legs substantially in the plane of symmetry of the animal;

(4) continuing this cut in substantially vertical downward direction;

(5) holding the intestines clear of the belly wall during step (4).

Use can also be made of a method characterized by (6) tensioning the belly wall during step (4) by pulling the belly wall outward. Otherwise than in known methods, the slaughtered animal is suspended from the hind legs in the method according to the invention and during continuing of the cut in the direction of the head of the animal the intestines are held clear of the belly wall, for instance by tensioning the belly wall by pulling this belly wall outward. When a slaughtered animal is hung up on the hind legs the organs present in the abdominal cavity tend under the influence of the force of gravity to hang downward in the direction of the midriff and rest against the inner side of the belly wall, whereby these organs could easily be cut into. Pulling the belly wall outward according to the invention avoids the risk of cutting into the internal organs. The pre-cut can be made without a great deal of caution because the organs at that position lie sufficiently free of the belly wall, whereafter the belly wall can subsequently be loaded on the inside via these pre-cuts for pulling outward.

According to the invention it is possible to follow the said steps with (7) continuing the cut after step (4) to cut through the midriff.

Thereafter use can be made of (8) continuing the cut after step (6) to cut through the breast bone.

In order to prevent the heart being touched by the knife and damaged, the method according to the invention may be characterized by (9) tearing open the pericardium during step (7) or step (8). The heart hereby comes to lie relatively freely which provides the possibility of (10) pressing the heart out of the path of the knife during step (8). The heart hereby remains intact.

Use can be made of a knife with a straight or curved, particularly concave curved, cutting edge. In preference however the method according to the invention is characterized by (11) using a rotatably driven disc-shaped knife for performing steps 3, 4, 6 and 7 or 8.

An effective continuation of the cut after opening of the belly wall is ensured with an embodiment of the method characterized by (12) moving the knife to the inside during step (7) or step (8).

The invention also relates to a device for opening a slaughtered animal suspended from the hind legs with application of a method according to the invention. Such a device is characterized by a rotatably drivable disc-shaped knife displaceable in a substantially vertical plane by means of guide means and having a cutting edge oriented such that the slaughtered animal can be opened therewith by being cut into during displacement of the knife; and a pin extending in the plane of the knife beyond the cutting edge thereof and having a guide surface for directing toward the belly wall which can slide along the inner surface of the belly wall of the slaughtered animal during opening of that animal and which pin holds the intestines clear of that belly wall, the relative positioning of the guide surface and the knife being such that the guide surface is adapted to press the belly wall towards and beyond the cutting edge of the knife.

With this pin, which can be supported by an arm and can form a hook-like member therewith, the inside of the belly wall can be pulled outward during performing of the cutting action.

The device according to the invention preferably has the feature that the guide surface has a rounded shape, for instance a spherical shape. This avoids snagging of the pin against unevenness on the inside of the belly wall.

An embodiment in which a notching member extends from the guide surface has the advantage that the midriff can be cut through easily herewith.

An important embodiment of the device according to the invention is characterized by actuating means for displacing the pin between a relatively low first position, wherein the pin is substantially oriented vertically downward, and a second position in which the pin is retracted.

This embodiment can have the special feature that the pin forms part of the guide means.

To move the pin between the said two positions the device may have the feature that the actuating means comprise a motor.

Simpler however is the embodiment in which the actuating means comprise spring means urging the pin to the first position.

In this embodiment, the pin, when encountering a certain resistance, for instance when meeting the midriff, can undergo a resistance force whereby it pivots from the first to a second position. In the embodiment in which the guide surface has no notching member, the cutting surface of the knife can be further released for cutting through the midriff by moving the pin to the second position. The pin can then pass through the resulting opening in the midriff. In the same manner a cut can be made in the pericardium and the heart can subsequently be pressed by the pin out of the path of the knife. The heart can thus remain intact during the cutting operation.

In a particular embodiment the device has the feature that the guide means are adapted such that the knife follows a preselected path. To perform the above described step (12) the device according to the invention can have the characteristic that the guide means are embodied such that the knife follows a path running roughly parallel to the shape of the contour to be followed of the slaughtered animal but, after cutting through the belly wall, is displaced over a distance to the inside during cutting through of the breast bone.

In a particular embodiment the device has the feature that the guide means are embodied such that the path of the knife deflects locally relative to a vertical plane. Particular organs of the slaughtered animal, for instance the male genital organ, can hereby be avoided during the cutting operation.

Such an advantage can also be obtained with an embodiment in which the guide means are embodied such that the knife has a limited displacement outside said vertical plane.

A fixed path, for instance parallel to the contour of the slaughtered animal for cutting open can be obtained with an embodiment in which the guide means comprise a rod mechanism coupled at two locations to a fixed position.

In order to be able to vary this path and follow a path differing from the contour during the cutting operation, such as for performing the method according to the invention with the above-described step (12), the device can have the characteristic that the guide means comprise at least one element of adjustable length controllable by means of control means.

The device may be characterized by drive means for drivably displacing the knife.

BRIEF DESCRIPTION OF THE DRAWINGS

The invention will now be elucidated with reference to the accompanying drawings, wherein.

BRIEF DESCRIPTION OF THE PREFERRED EMBODIMENTS

A support 1 for suspending slaughtered animals, in this case pigs, on the hind legs may be a component of a transport system, wherein the support 1 is for instance a bent or straight tube which is hung from a ceiling by means that are not shown. Hook-like elements 2 can be pushed along the tube 1 by means that are not shown, to which hook-like element are fastened the hind legs of the slaughtered animal. Diverse operations are performed on the slaughtered animal along the transport path defined by the shape of the tube 1, and the invention is limited here to the opening of the slaughtered animal so that the intestines of the animal become accessible.

Figure 1:
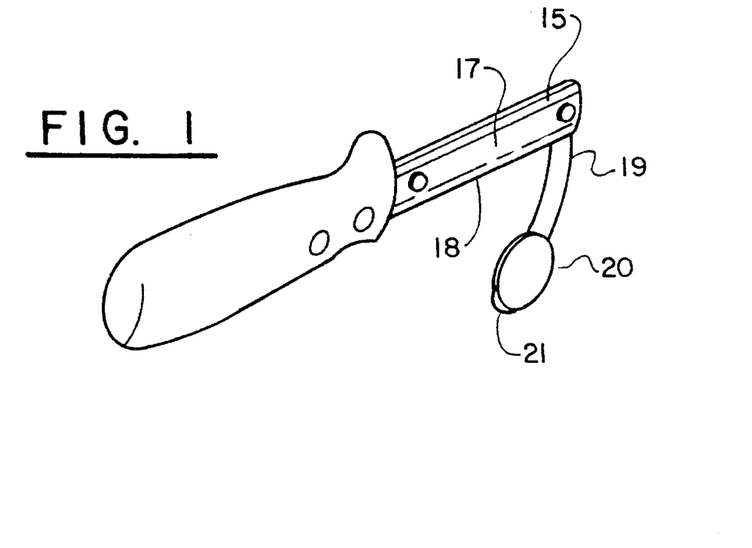
FIG. 1 shows a perspective view of a cutting device embodied as a hand knife.

Manual performance of the opening of the carcass is possible using the hand knife according to FIG. 1.

A hand-grip is equipped for this purpose with a knife holder 15 which is fixedly attached to the carriage by means of two bolts 16. The knife holder 15 is embodied with a replaceable knife blade 17 with a downward facing cutting edge 18. The knife holder 15 is moreover lengthened with an extension 19 which ends in a sphere-segment-shaped guide surface 20. The angle between the extension 19 and knife holder 15 is smaller than 180°. The sphere-segment-shaped guide surface 20 is provided with a notching member 21.

Opening of the carcass can also be performed by a machine, for which purpose a vertical guiding 3 is arranged at a certain distance from the support 1, along which guiding a carriage 4 is movable up and downward. The guiding stands vertically here but can assume any desired position, while it can moreover deviate from the straight line.

Figure 3:
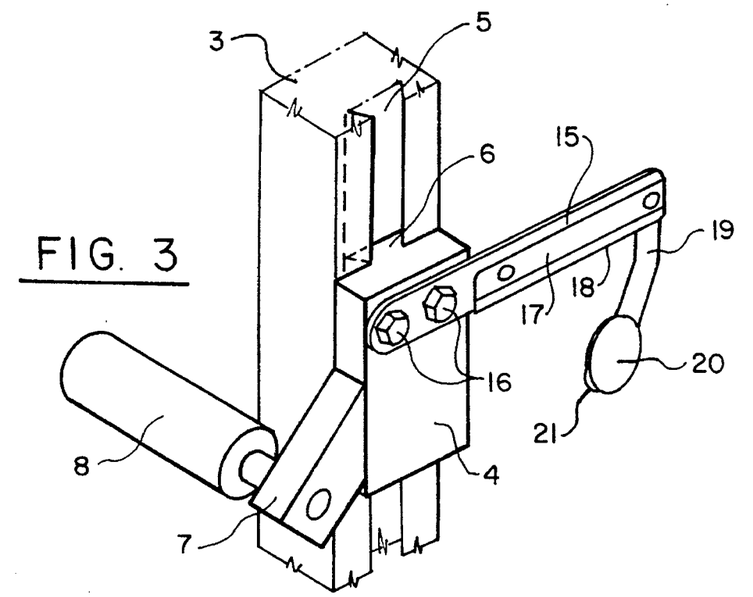
FIG. 3 a machine-version of the device of FIG. 1.
Figure 4:
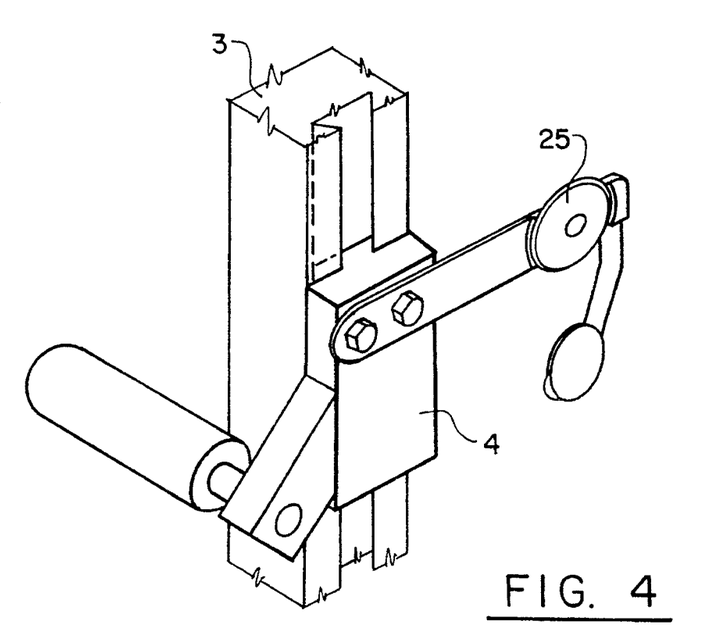
FIGS. 4 and 5 show perspective views of two different embodiments of the invention.
Figure 5:
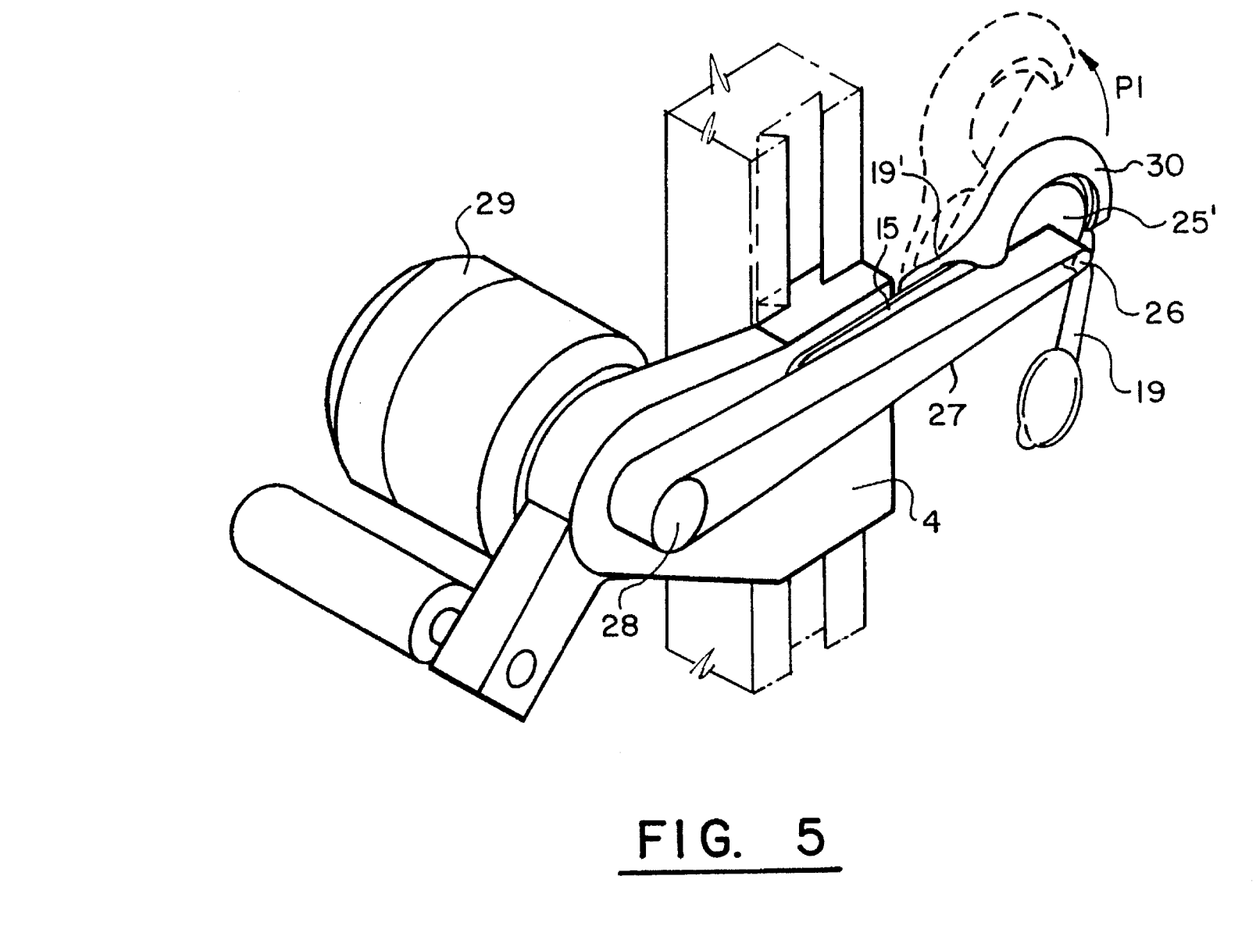

As shown in FIGS. 3–5, the guiding is a bar of rectangular cross section wherein a dovetail groove 5 is recessed in which a dovetail wedge 6 of carriage 4 is received fittingly and slidably.

The carriage is embodied with an arm 7 to which can be fixed a hand-grip 8 for accomplishing the reciprocating movement as referred to above. The hand-grip can alternatively be used as point of engagement for an endless belt 9 which is arranged round reversing rollers 10 on the top and bottom of the vertical guiding 3, one of which rollers can be set into rotation for instance by an electric motor 11. Due to the coupling of arm 7 to a part of the endless element 9 the carriage can be moved along the guiding 3 in respectively up and downward sense by energizing the motor 11.

The above described device can be used according to the method of the invention. To this end, the slaughtered animal 2 suspended from the support 1 is first provided with a pre-cut V on the left in FIG. 2, whereafter, by placing the slaughtered animal in front of the guiding 3, that is, with the belly side facing thereto, the extension 19 with guide surface 20 can be hooked into this pre-cut behind the belly wall. By subsequently moving the hand knife downward or by energizing the motor 11 the carriage 4 and therewith the knife holder 15 with the knife 17 are moved downward. During the downward movement a continuous outward directed force must be exerted on the inner wall of the belly wall of the slaughtered animal by means of the spherical guide surface 20, whereby the belly wall is wholly opened by the cutting edge 18 of knife 17 during the downward movement. The cut is continued until the guide surface touches the midriff, which is cut through by the notching knife 21, and then as far as the breast bone, the beginning of which is indicated with A and the end with B. The cut can be ended at A but can also be continued at B, for which purpose the knife 17 can be carried along or through the breast bone. The belly side of the slaughtered animal is thus entirely opened.

Figure 2:
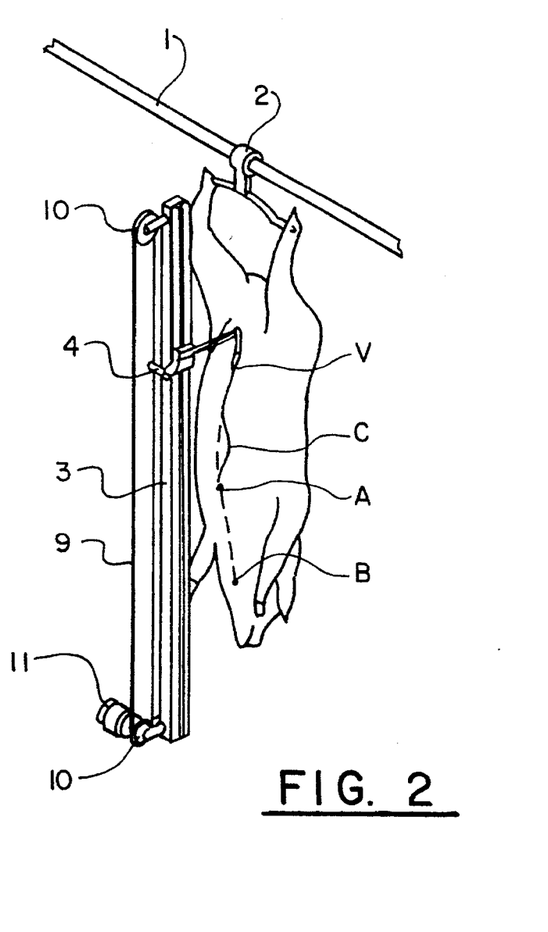
FIG. 2 shows a schematic perspective view of an installation with a cutting device.

It is noted that at the position of the male genital organ the straight cut can be replaced by a deflection C, which cut can be realized by allowing the knife holder 15 to follow a path deviating from the straight path. This can be carried out for instance by locally bending outward the guide bar 3, but it is possible to arrange the knife holder 15 slidably relative to the carriage 4 and have it moved by separate drive means.

FIG. 4 shows an embodiment which is in accord with the invention distinguished from the embodiment of FIG. 3 in that the knife 17 is not embodied as a straight knife blade but as a freely rotatable circular knife blade 25. The operation of this device is otherwise the same as that of FIG. 3. It is noted that the guide surface 20 is positioned "upstream" or in front of the knife 25, in the path followed thereby.

FIG. 5 shows a device wherein the carriage 4 is embodied with a knife holder 15 provided with a driven knife blade 25'. The knife blade is embodied with a pinion 26 around which is trained an endless element 27 which can be set into rotation by a motor 29 via a drive pinion 28. The knife blade 25' can be set into rotation herewith, which can improve the cutting action.

The knife blade 25' can also be used for arranging the pre-out V. The extension 19 is fixed to a pivot arm 19' which can be folded upward according to arrow P1 so that the knife 25 on the front side is released. A protective cover 30 can be fastened to the extension 19 which protects the upper part of the knife in the downward folded position.

Figure 6:
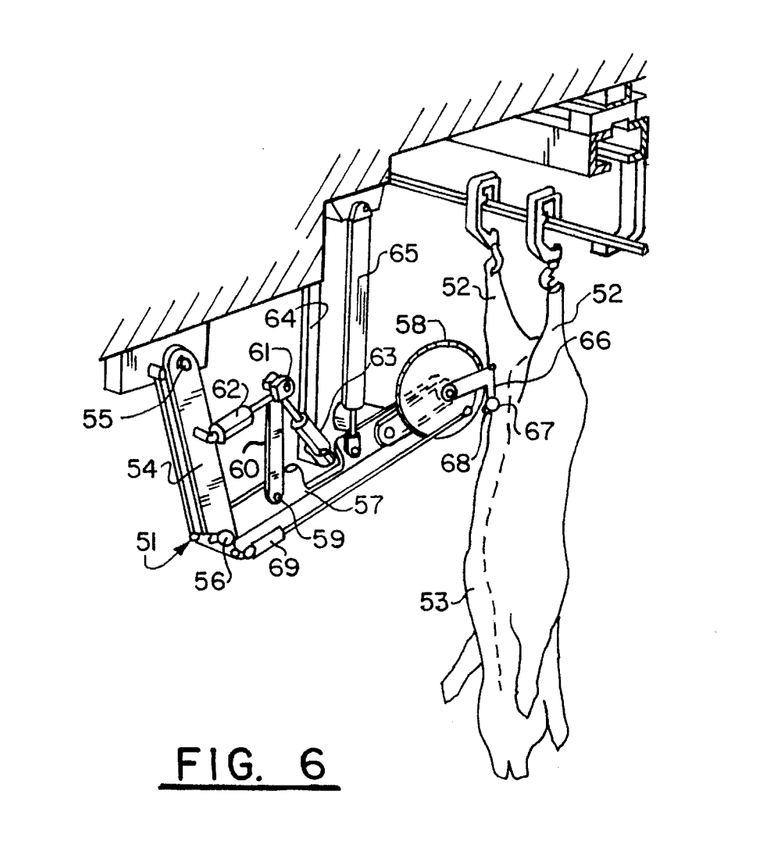
FIG. 6 is a perspective view of a device according to the invention, wherein the guiding of the disc-shaped, rotatably driven knife takes place by means of an assembly of rods and cylinders.

FIG. 6 shows a device 51 for cutting open a pig 53 suspended from the hind legs 52. The device comprises a construction to be described hereinbelow with a number of arms and cylinders connected for mutual pivoting, all of which are movable in a vertical plane.

A first arm 54 is coupled to a fixed position via a first hinge 55. Via a second hinge 56 the first arm 54 supports a second arm 57 which bears a knife 58 driven rotatably by means of a motor 71. At a distance from the second hinge 56 the second arm 57 supports via a third hinge 59 a third arm 60 which supports via a fourth hinge 61 two cylinders 62, 63. The first cylinder 62 is connected to the first arm 54 and the second cylinder 63 is connected via a rod 64 to a fixed position. Further a drive cylinder 65 extends between this fixed position and the second arm 57. This drive cylinder 65 is the main drive for displacing the knife 58 in vertical direction during processing of the pig 53.

Placed for coaxial pivoting with the knife 58 is a guide pin 66 with a rounded guide surface 67 with a notching member 68. The guide pin 66 can be swivelled round the knife 58 by means of a third cylinder 69.

Not drawn are the control means needed to provide the cylinders 62, 63, 65, 69 with a variable length.

FIGS. 7–15 show schematically the manner in which the device 51 opens the pig 53. Indicated with a dash-dot line is the path 70 followed by the centre 72 of the knife 58. The path is characterized in the figures with the finishing points of the successive parts, the finishing points of which are indicated respectively with 73, 74, 75, 76, 77, 78, 79, 80 and 81. The path 70 will now be first briefly described. Indicated herein is which position the respective cylinders 62, 63 and 65 assume, this with the designations "IN" and "OUT".

Figure 7:
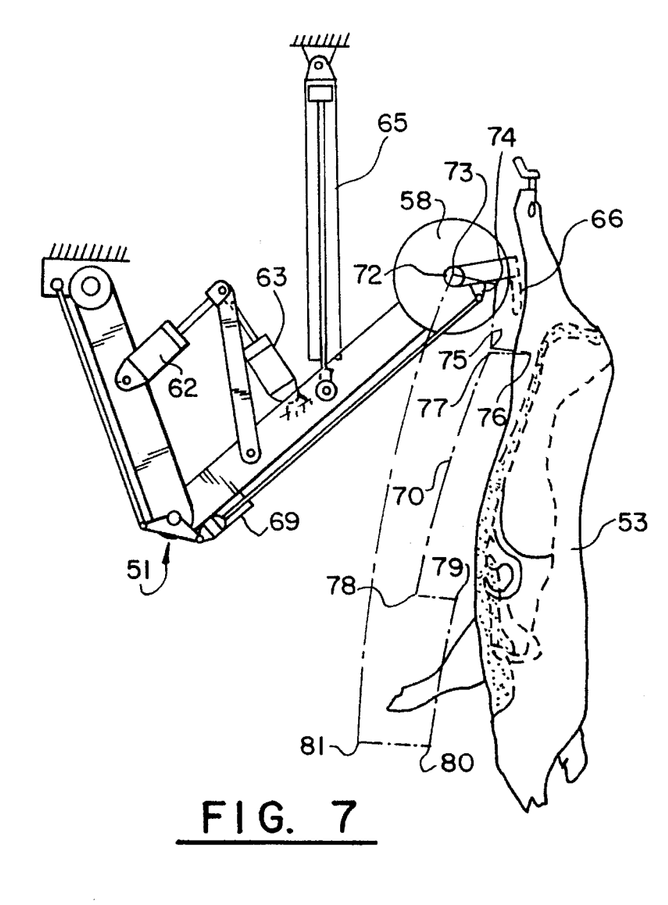
FIGS. 7–15 show schematic cross sectional views of the device according to FIG. 6 in different stages of the cutting operation.

The rest position 73 shown in FIG. 7 is a starting position in which the cylinder 62 is OUT, the cylinder 63 is OUT and cylinder 65 IN.

Figure 8:
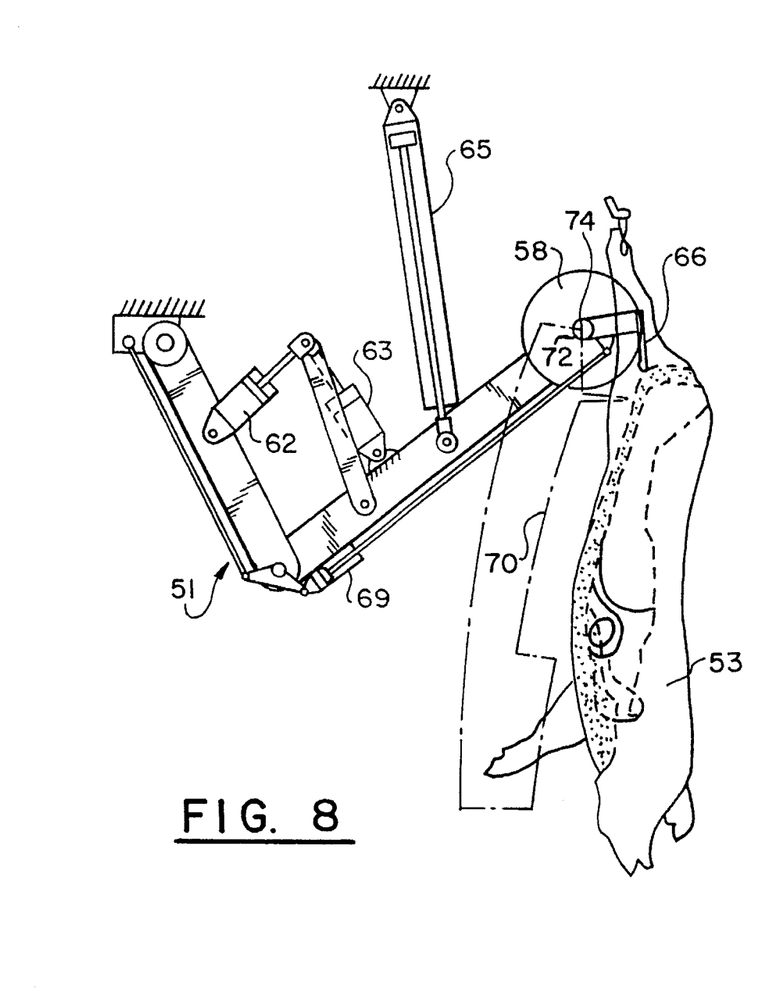

The position 72 shown in FIG. 8 is the starting position in which the cylinder 62 is IN.

Figure 9:
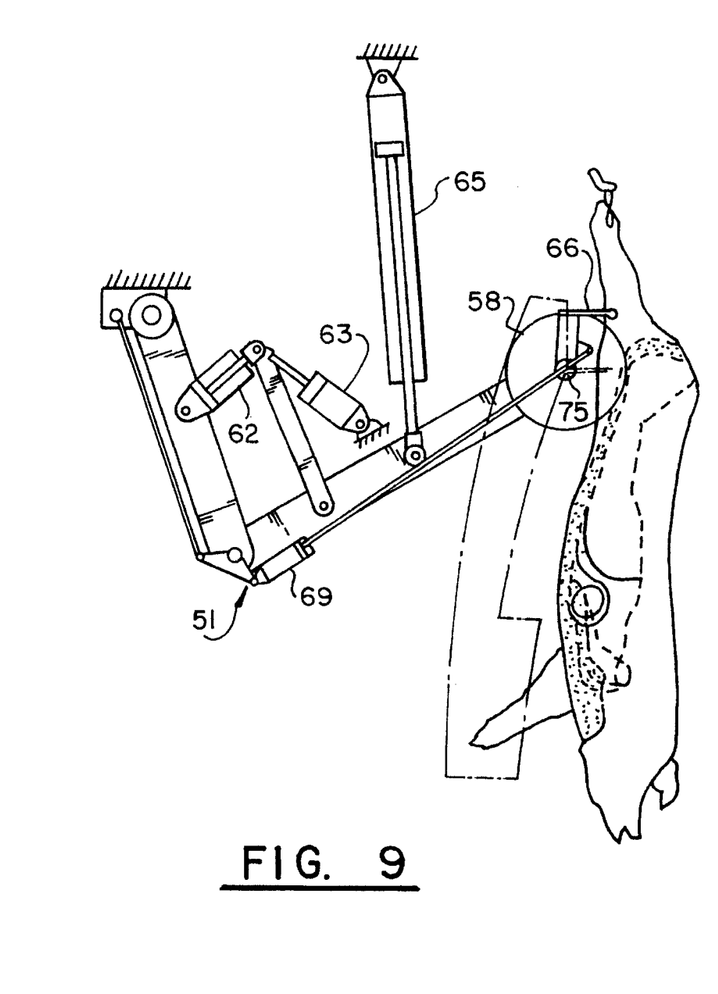

The position 75 shown in FIG. 9 is a search position in which the cylinder 65 is slightly OUT.

Figure 10:
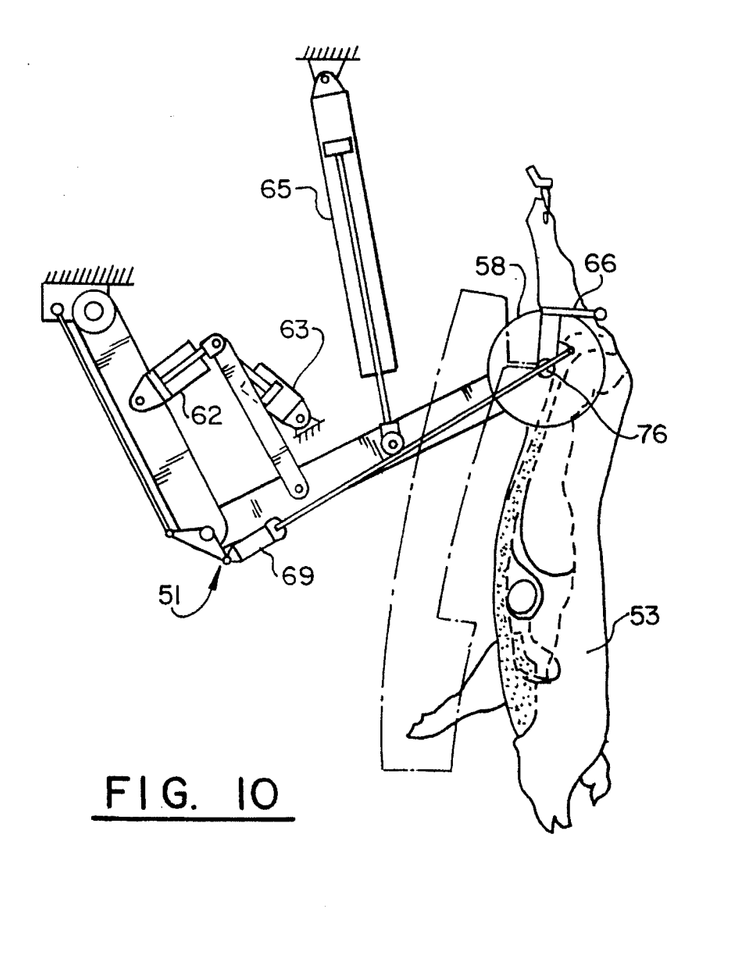

FIG. 10 shows the cutting position 76. The cylinder 63 is IN but can optionally assume an intermediate position.

Figure 11:
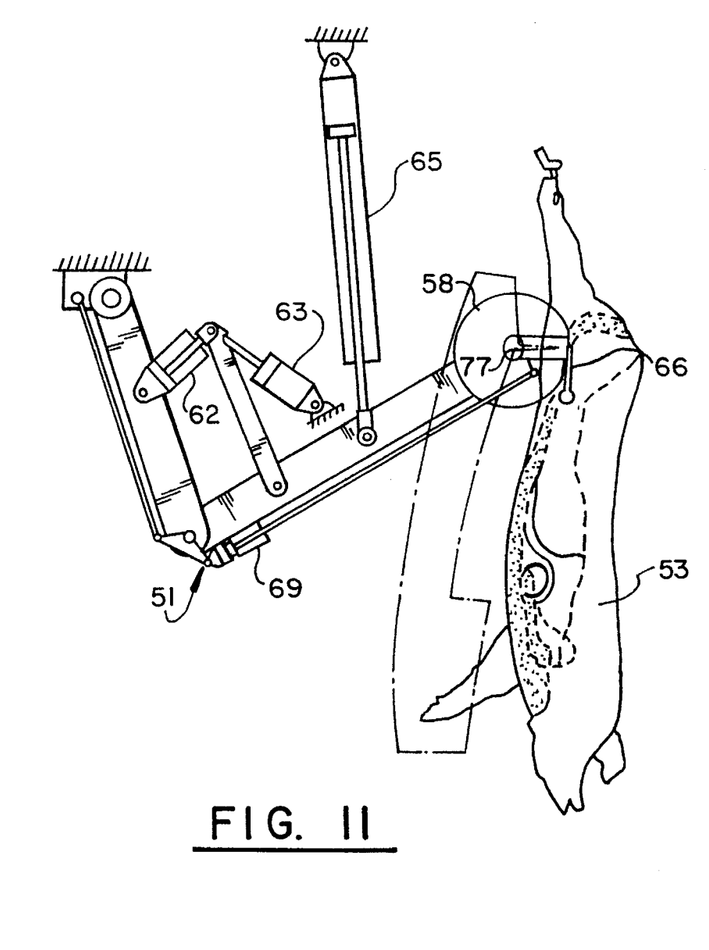

FIG. 11 shows a retracted position 77 corresponding with the position 75 shown in FIG. 9. The reason for this reciprocal displacement is explained hereinbelow.

Figure 12:
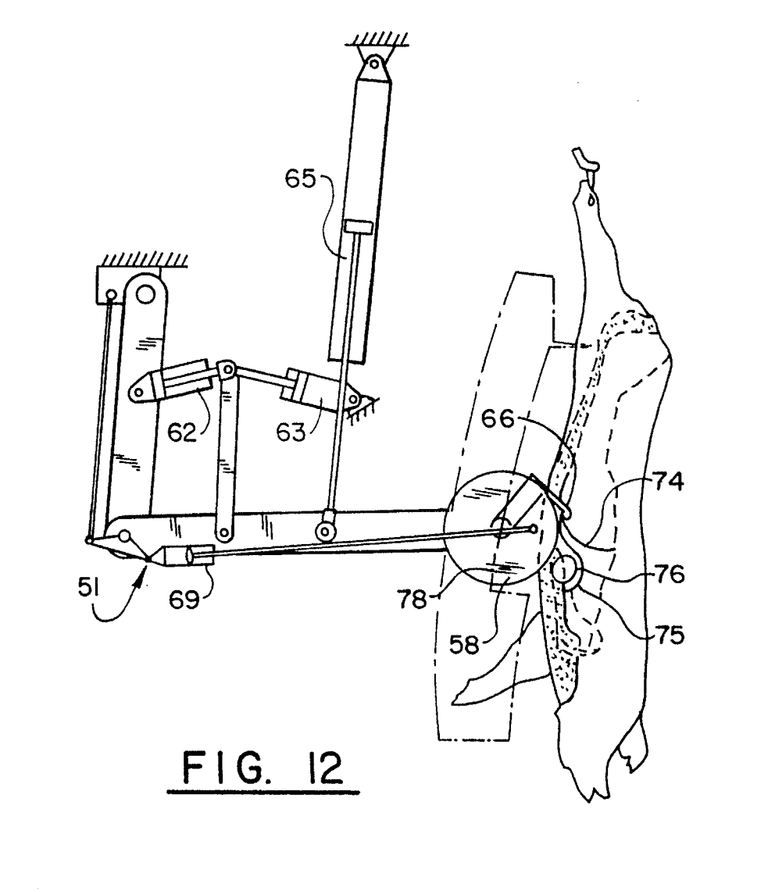

FIG. 12 shows a position 78 in which the cylinder 65 is approximately half OUT.

Figure 13:
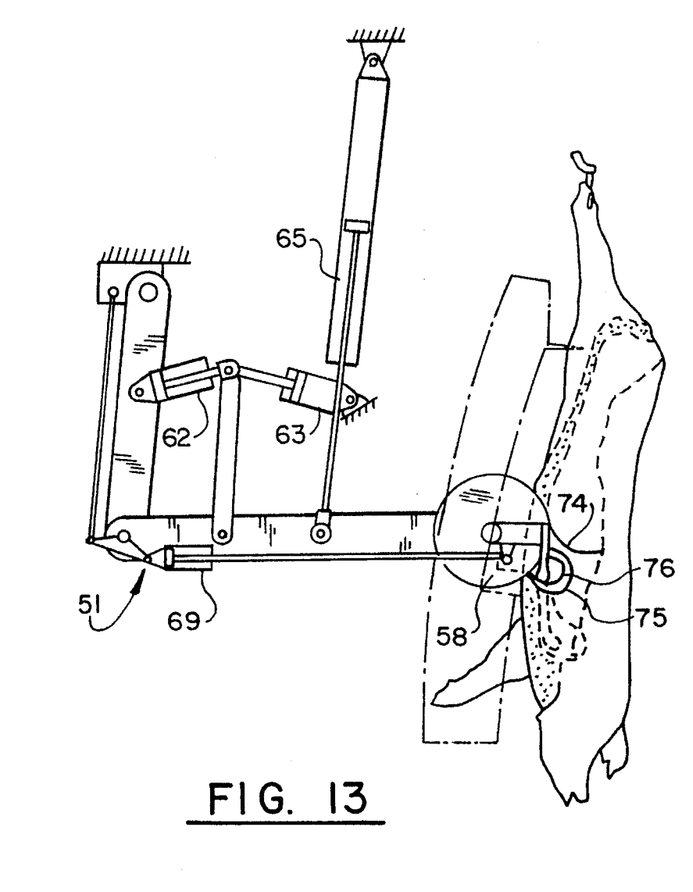

FIG. 13 shows a position 79 displaced to the inside in which the cylinder 63 is IN but can optionally assume an intermediate position.

Figure 14:
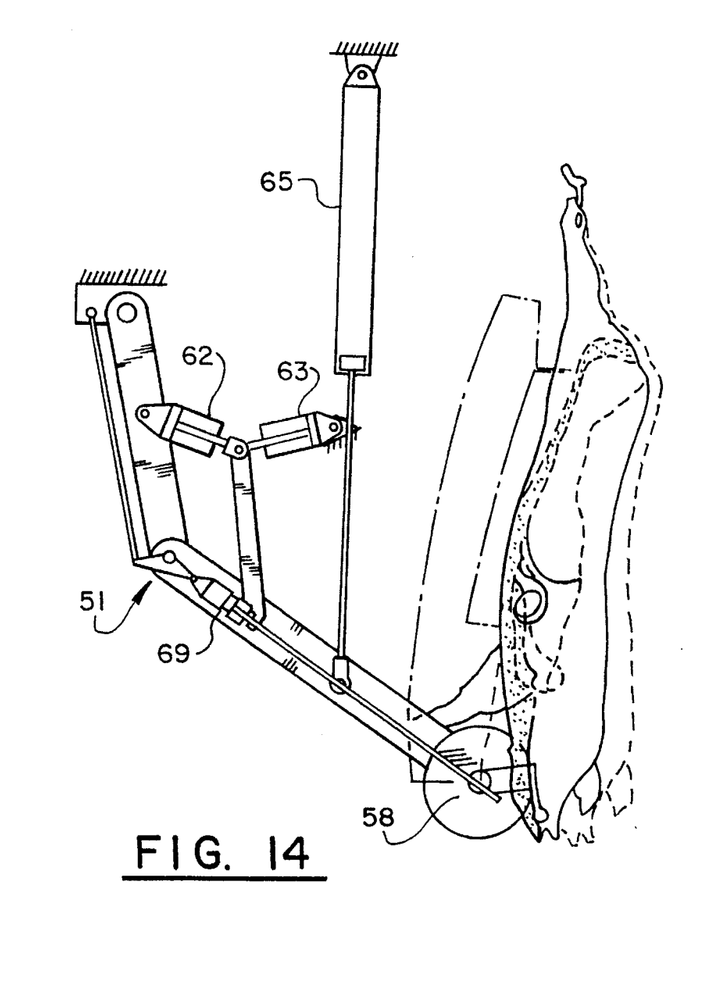

FIG. 14 shows the finishing position 80 of the actual cutting operation. The cylinder 65 is herein OUT.

Figure 15:
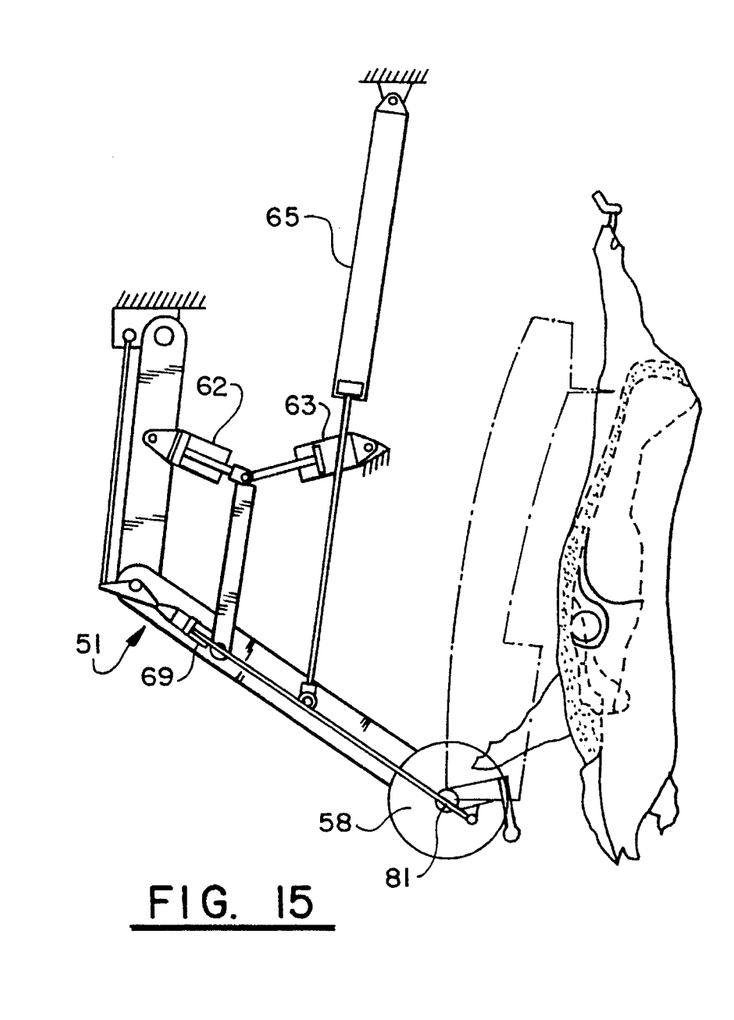

FIG. 15 shows the swing-out position 81 in which cylinder 62 and cylinder 63 are both OUT. The device 51 is subsequently returned to the starting situation shown in FIG. 7.

The guide pin 66 can assume different positions under the control of the cylinder 69. This pin 66 makes an essential contribution to correct performing of the cutting operation. In the situation shown in FIG. 7 the position of pin 66 is in principle irrelevant.

In the position 72 according to FIG. 8 the position of pin 66 is likewise irrelevant.

In the position 75 according to FIG. 9 a cut must first be made in the belly wall of pig 53. The pin is set for this purpose into its raised position by energizing cylinder 69.

In the position 76 according to FIG. 10 the knife is moved inward to make the cut.

During the transition from the position 76 to the position 77 shown in FIG. 11, in which the knife is retracted from the cut made in the belly wall, the pin 66 is displaced downward. The pin can hereby protrude through the made cut into the abdomen of the pig 53. In the position 77 it can pull the belly wall outward, whereby the intestines are held clear of the belly wall, whereby knife 58 cuts only through the belly wall and leaves the intestines intact.

In the path between the position 77 and the position 78 according to FIG. 12 the belly wall is cut through. In the position 78 the knife 58 has reached the breast bone 73. This is on the verge of being cut through by the knife 58. The pin 66 has meanwhile moved upward to the position shown in FIG. 12 through contact with the tough midriff 74. It is noted that for this purpose use can be made of either a spring load or a sensor controlling the cylinder 69.

The knife 58 is subsequently moved from the position 78 to the position 79 according to FIG. 13. Herein a first cutting through of the breast bone takes place. The pin 66 has meanwhile cut through or torn the midriff, displaced downward to the position drawn in FIG. 13 and thus is in a position to cut or tear through the pericardium 75, followed by pressing the heart 76 out of the path of the knife 58. This therefore remains intact during the operation with the knife 58.

A downward continued displacement to the position 80 shown in FIG. 14 then takes place. The pin 66 also serves here to pull the throat wall of pig 53 to the path of the knife. This has a very beneficial effect on the reliability of the cutting operation due to the positive guiding of the knife 58. When the knife 58 has reached the position 80 shown in FIG. 14 it has left the larynx cavity of pig 53 and the actual cutting operation is completed. The knife can subsequently be placed in a position for processing a following pig. To this end a displacement first takes place to the position 81 according to FIG. 15 wherein the pin is again situated in its folded down position, followed by a displacement to the starting position 73 as in FIG. 7.

It will be apparent that mechanically the device 51 is comparatively simple and can be embodied inexpensively. Attention is drawn to the fact that the pin 66 does not have to be controlled by the cylinder 59 but can also be spring loaded. Control of pin 66 can also take place by means of the cylinder 69 on the basis of measurement data provided for instance by a pressure-sensitive sensor on the free extremity of pin 66.

We claim:

1. A method for opening a slaughtered animal comprising the steps of:

(1) providing a slaughtered animal having a plane of symmetry, hind legs and a belly wall;

(2) suspending the animal from the hind legs;

(3) positioning a cut only in the belly wall close to the hind legs substantially in the plane of symmetry of the animal;

(4) continuing said cut in a substantially vertically downward direction;

(5) holding the intestines of the animal clear of the belly wall during step (4) by sliding a guide surface along an inner surface of the belly wall;

(6) tensioning the belly wall during step (4) by pulling the belly wall outward;

(7) continuing said cut after step (4) to cut through the midriff of the animal; and (8) continuing said cut after step (6) to cut through the breast bone of the animal.

2. The method as claimed in claim 1, further including the step of:

(9) tearing open the pericardium of the animal during at least one of steps (7) and (8).

3. The method as claimed in claim 1, further including the step of:

(10) pressing the heart out of the path of a knife means which is performing said cut during step (8).

4. The method as claimed in claim 1, further including the step of:

(11) using a rotatably driven disc-shaped knife for said knife means.

5. The method as claimed in claim 4, further including the step of:

(12) moving said knife inside of the animal during step (8).

6. A device for opening a slaughtered animal suspended from the hind legs, said device comprising:

guide means;

a rotatably drivable disc-shaped knife displaceable in a substantially vertical plane by said guide means, said knife having an axis of rotation and a cutting edge, with said cutting edge oriented such that the slaughtered animal is opened therewith by being cut into during displacement of said knife; and a pin extending in said plane of said knife and configured to pivot with respect to said knife between a first position in which said pin is positioned in advance of said cutting edge of said knife and a second position in which said pin is retracted, said pin having a guide surface configured to slide along an inner surface of a belly wall of the slaughtered animal during opening thereof, whereby a portion of said cutting edge which engages the animal during cutting is located between said axis of rotation and said guide surface, whereby said pin holds the intestines clear of the belly wall, and wherein the relative positioning of said guide surface and said knife is such that said guide surface is configured to press the belly wall towards and beyond said cutting edge of said knife.

7. The device as claimed in claim 6, wherein said guide surface has a rounded shape.

8. A device for opening a slaughtered animal suspended from the hind legs, said device comprising:

guide means;

a rotatably drivable disc-shaped knife displaceable in a substantially vertical plane by said guide means, said knife having an axis of rotation and a cutting edge, with said cutting edge oriented such that the slaughtered animal is opened therewith by being cut into during displacement of said knife;

a pin extending in said plane of said knife in advance of said cutting edge, said pin having a guide surface configured to slide along an inner surface of a belly wall of the slaughtered animal during opening thereof, wherein a portion of said cutting edge which engages the animal during cutting is located between said axis of rotation and said guide surface, wherein said pin holds the intestines clear of the belly wall, wherein the relative positioning of said guide surface and said knife is such that said guide surface is configured to press the belly wall towards and beyond said cutting edge of said knife, and wherein said guide surface has a rounded shape; and a notching member extending from said guide surface.

9. The device as claimed in claim 7, wherein said guide surface has a spherical shape.

10. The device as claimed in claim 6, wherein said guide means is configured such that the path of said knife deflects locally relative to said vertical plane.

11. The device as claimed in claim 6, wherein said guide means is configured such that said knife has a limited displacement outside said vertical plane.

12. The device as claimed in claim 6, further including drive means for drivably displacing said knife.

13. A device for opening a slaughtered animal suspended from the hind legs, said device comprising:

guide means;

a rotatably drivable disc-shaped knife displaceable in a substantially vertical plane by said guide means and having a cutting edge oriented such that the slaughtered animal is opened therewith by being cut into during displacement of said knife;

a pin extending in said plane of said knife and configured to pivot with respect to said knife between a first position in which said pin is positioned beyond said cutting edge of said knife and a second position in which said pin is retracted, said pin having a guide surface configured to slide along an inner surface of a belly wall of the slaughtered animal during opening of the animal whereby said pin holds the intestines clear of the belly wall, the relative positioning of said guide surface and said knife being such that said guide surface is adapted to press the belly wall towards and beyond said cutting edge of said knife; and actuating means for displacing said pin between said first position in which said pin is oriented substantially vertically downward and said second position in which said pin is retracted.

14. The device as claimed in claim 13, wherein said pin forms part of said guide means.

15. The device as claimed in claim 13, wherein said actuating means includes a motor.

16. The device as claimed in claim 13, wherein said actuating means includes spring means urging said pin to said first position.

17. The device as claimed in claim 13, wherein said guide means is adapted such that said knife follows a preselected path.

18. The device as claimed in claim 17, wherein said guide means includes a rod mechanism coupled at three locations to a fixed position.

19. The device as claimed in claim 17, wherein said guide means is configured such that said knife follows a path substantially parallel to the shape of the contour to be followed of the slaughtered animal and wherein after cutting through the belly wall, said knife is displaced inside of the animal at least one of during and prior to at least one of cutting through of the attachments between the ribs and the breast bone and cutting through the breast bone.

20. The device as claimed in claim 13, wherein said guide surface has a rounded shape.

21. The device as claimed in claim 13, wherein said guide surface has a spherical shape.

22. The device as claimed in claim 13, wherein said guide means is configured such that the path of said knife deflects locally relative to said vertical plane.

23. The device as claimed in claim 13, wherein said guide means is configured such that said knife has a limited displacement outside said vertical plane.

24. The device as claimed in claim 13, further including drive means for drivably displacing said knife.

25. A device for opening a slaughtered animal suspended from the hind legs, said device comprising:

guide means;

a rotatably drivable disc-shaped knife displaceable in a substantially vertical plane by said guide means and having a cutting edge oriented such that the slaughtered animal is opened therewith by being cut into during displacement of said knife;

a pin extending in said plane of said knife beyond said cutting edge thereof and having a guide surface configured to slide along an inner surface of a belly wall of the slaughtered animal during opening of the animal, wherein said pin holds the intestines clear of the belly wall, the relative positioning of said guide surface and said knife being such that said guide surface is adapted to press the belly wall towards and beyond said cutting edge of said knife;

actuating means for displacing said pin between a relatively low first position in which said pin is oriented substantially vertically downward and a second position in which said pin is retracted, wherein said guide surface has a rounded shape; and a notching member extending from said guide surface.

26. A device for opening a slaughtered animal suspended from the hind legs, said device comprising:

guide means;

a rotatably drivable disc-shaped knife displaceable in a substantially vertical plane by said guide means and having a cutting edge oriented such that the slaughtered animal is opened therewith by being cut into during displacement of said knife;

a pin extending in said plane of said knife beyond said cutting edge thereof and having a guide surface configured to slide along an inner surface of a belly wall of the slaughtered animal during opening of the animal, wherein said pin holds the intestines clear of the belly wall, the relative positioning of said guide surface and said knife being such that said guide surface is adapted to press the belly wall towards and beyond said cutting edge of said knife; and actuating means for displacing said pin between a relatively low first position in which said pin is oriented substantially vertically downward and a second position in which said pin is retracted, wherein said guide means is adapted such that said knife follows a preselected path, wherein said guide means includes a rod mechanism coupled at three locations to a fixed position, and wherein said guide means includes at least one element of adjustable length controllable by a control means.

27. A device for opening a slaughtered animal suspended from the hind legs, said device comprising:

guide means;

a knife displaceable in a substantially vertical plane relative to the animal by said guide means and having a cutting edge oriented such that the slaughtered animal is opened therewith by being cut into during displacement of said knife; and a pin extending in said plane of said knife and configured to pivot with respect to said knife between a first position in which said pin is positioned beyond said cutting edge of said knife and a second position in which said pin is retracted, said pin having a guide surface configured to slide along an inner surface of a belly wall of the slaughtered animal during opening, whereby said pin holds the belly wall clear of the intestines, and wherein the relative positioning of said guide surface and said knife is such that said guide surface is configured to press the belly wall towards and beyond said cutting edge of said knife.

28. The device as claimed in claim 27, wherein said knife is disc-shaped and rotatably drivable.

29. The device as claimed in claim 27, including spring means configured to bias said pin toward said first position.

30. The device as claimed in claim 27, including actuating means for pivoting said pin between said first position and said second position, wherein said actuating means includes a cylinder having a movable piston rod connected to said pin.

* * * * *